(12) United States Patent
Feigenblum

(10) Patent No.: US 12,337,515 B2
(45) Date of Patent: Jun. 24, 2025

(54) INDUCTION HEATING DEVICE FOR MOLDING PARTS WITH SMALL DIMENSIONS

(71) Applicant: ROCTOOL, Le Bourget deu Lac (FR)

(72) Inventor: José Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 0 days.

(21) Appl. No.: 18/273,358

(22) PCT Filed: Jan. 20, 2022

(86) PCT No.: PCT/EP2022/051286
§ 371 (c)(1),
(2) Date: Jul. 20, 2023

(87) PCT Pub. No.: WO2022/157275
PCT Pub. Date: Jul. 28, 2022

(65) Prior Publication Data
US 2024/0308121 A1  Sep. 19, 2024

(30) Foreign Application Priority Data
Jan. 20, 2021 (FR) ..................................... 2100551

(51) Int. Cl.
*B29C 45/73* (2006.01)
*B29C 33/06* (2006.01)
(Continued)

(52) U.S. Cl.
CPC .............. *B29C 45/73* (2013.01); *B29C 33/06* (2013.01); *H05B 6/36* (2013.01);
(Continued)

(58) Field of Classification Search
CPC . B29C 45/73; B29C 33/06; B29C 2045/7368; B29C 45/7312
See application file for complete search history.

(56) References Cited

U.S. PATENT DOCUMENTS

2014/0021653 A1\* 1/2014 Nemazi ................... B23P 15/24
249/59

FOREIGN PATENT DOCUMENTS

JP  S63139721 A  6/1988
JP  H0596576 A  4/1993
(Continued)

OTHER PUBLICATIONS

JP2001113580A-Machine Translation (Year: 2001).\*
(Continued)

*Primary Examiner* — Yunju Kim

(57) ABSTRACT

The invention relates to a mold for small-sized parts, comprising a casing configured to be assembled on a press platen (101, 102) the casing comprising a housing receiving an insert; the insert comprising a housing for a die comprising a molding surface (121, 122); a device for heating the die, the device comprising a rod (131, 132) made of a material susceptible to induction heating mounted in the insert (350) and having one end in contact with the die, a coil (141, 142) surrounding the rod and connected to a high-frequency current generator (151, 152) such that when the coil is electrically powered, it generates an induced current in the rod (131, 132), heating the rod by induction, the rod transmitting heat to the die, wherein an outer diameter of the rod is greater than or equal to an outer diameter of a perimeter delimiting the molding surface (121, 122).

12 Claims, 4 Drawing Sheets

(51) Int. Cl.
  *B29C 45/00*   (2006.01)
  *H05B 6/36*    (2006.01)
  *B29L 11/00*   (2006.01)
(52) U.S. Cl.
  CPC .............. *B29C 2045/0094* (2013.01); *B29C 2045/7368* (2013.01); *B29L 2011/0016* (2013.01)

(56) References Cited

FOREIGN PATENT DOCUMENTS

| | | | |
|---|---|---|---|
| JP | H05185472 | A | 7/1993 |
| JP | 2001113580 | A | 4/2001 |
| JP | 6464227 | B2 * | 2/2019 |
| KR | 20170140497 | A * | 12/2017 |
| WO | 2011040180 | A1 | 4/2011 |
| WO | WO-2018177460 | A1 * | 10/2018 ............. B29C 33/06 |

OTHER PUBLICATIONS

JP6464227B2-Machine Translation (Year: 2019).*
KR20170140497A-Machine Translation (Year: 2017).*
WO2018177460A1—Machine Translation (Year: 2018).*

* cited by examiner

INDUCTION HEATING DEVICE FOR MOLDING PARTS WITH SMALL DIMENSIONS

RELATED APPLICATIONS

This application is a § 371 applications of PCT/EP2022/051286 filed Jan. 20, 2022, which claims priority from French Patent Application No. 21 00551 filed Jan. 20, 2021, each of which is incorporated herein by reference in its entirety.

TECHNICAL FIELD

The invention belongs to the field of molding processes, more specifically for the molding of small parts.

By way of nonlimiting example, the invention applies to the molding of lenses intended for a smartphone camera.

The invention relates to a tooling adapted to the mass production of this type of part, provided with a device for rapid heating and cooling.

BACKGROUND ART

In the molding in very large runs of glass or plastic parts, called organic glass, whose casting temperatures are relatively high, the heating and cooling times of the molds have a major influence on the manufacturing cycle times.

Indeed, the mold has to be heated to a temperature ensuring sufficient fluidity of the molded material so as to ensure homogeneous filling of the cavity, and then cooled to a sufficient consolidation temperature of the material used, to allow removal without damaging the part thus produced. Depending on the molded material, these temperatures are defined, for example, in relation to the melting and solidification temperatures of the material and/or in relation to the glass transition temperature or crystallization of said material.

In general, the molds are massive in comparison with the manufactured part and their mass is higher by several orders of magnitude compared to the mass of the molded part.

Thus, the concept of rapid heating and cooling applies essentially to the mass of the mold.

The induction heating techniques, coupled with cooling by fluid circulation, as described, for example, in documents U.S. Pat. No. 7,679,036 or U.S. Pat. No. 10,232,530, make it possible to concentrate the heating on the surfaces of the mold in contact with the molded material, while ensuring a uniform heating temperature on these surfaces.

Thus, by limiting the volume of heated and cooled material, and by taking advantage of the high heating power enabled by induction heating, these techniques of the prior art make it possible to reduce the heating-cooling cycle times.

However, when the manufactured parts are of small size, for example a lens with a diameter of less than 10 mm, and more generally less than 2 mm, when said parts are moreover thin, for example with a thickness of between 0.1 mm and 0.3 mm, and when said parts must be produced with high precision, compatible with optics, these techniques of the prior art are ill-suited, even when considering a mold comprising a plurality of impressions.

Moreover, even by implementing these techniques of prior art, the volume and mass undergoing thermal cycles are important with regard to the mass of the parts produced.

SUMMARY OF THE INVENTION

The invention aims at solving the shortcomings of the prior art and to this end relates to a mold, adapted to molding a small-sized part, and comprising a casing configure for being assembled on a press platen, the casing comprising a housing configured to receiving an insert; the insert being configured to be integrated into the casing and comprising a housing for a die comprising a molding surface for the part a device for heating the die, the device comprising a rod made of a material susceptible to induction heating, the rod being mounted in the insert and having one end in contact with the die, the molding surface being substantially centered with respect to the rod a coil made of an electrically conductive material and surrounding the rod, the coil being connected to a high-frequency current generator so that when the coil is supplied with an electric current, it generates an induced current in the rod, heating the rod by induction, the rod transmitting heat to the die, and wherein an outer diameter of the rod is greater than or equal to an outer diameter of a perimeter delimiting the molding surface.

Thus, the mold of the invention makes it possible to concentrate the heating on the molding surface by using the combination of the rod and of the coil, in order to rapidly reach a high temperature at on the molding surface, while using only a reduced electrical power.

The invention may be carried out according to the embodiments and variants exposed hereafter, which are to be considered individually or according to any technically operative combination.

Advantageously, the casing comprises a circuit for the circulation of a heat transfer fluid for cooling the insert and the die.

As a result, cycle times are reduced by the possibility of forced cooling.

According to a particular embodiment, the insert comprises a circuit for the circulation of a heat transfer fluid, connected to the fluid circulation circuit of the casing.

In addition to a faster cooling of the die and reduced cycle times, this circuit also allows for thermal regulation by concurrently using induction heating and fluid circulation cooling, for applications that may require it.

According to a particular embodiment, the casing and the insert have separate cooling circuits. This embodiment allows different heat transfer fluids to be circulated in the casing and in the insert, said fluids being adapted to the temperatures they respectively reach during the molding operation.

According to one embodiment, the cooling circuit of the insert comprises a baffle. Such a baffle promotes turbulent flow of the cooling fluid in the conduit and convective exchanges with the walls.

Advantageously, the mold comprises a thermocouple housed inside the rod, the hot junction being close to the end of the rod.

The information issued by the thermocouple makes it possible to control both heating and cooling in order to optimize the manufacturing cycle.

According to a preferred embodiment, the outer diameter of the perimeter delimiting the outer of the molding surface is less than 5 mm, preferably less than 2 mm.

According to an advantageous embodiment, the coil producing the induction is made of copper and comprises an annular part, surrounding a second part of the rod, and stems for its connection to a source of high-frequency alternating current, the sections of the stems and of the annular part being less than or equal to 10 mm². Thus, the reduced section of the coil limits its electrical resistance and its heating under the effect of AC current flow, so there is no need to implement a forced cooling device for the coil.

According to a preferred embodiment, the die comprises a molding portion bearing the molding surface, made of a steel susceptible to induction heating and a technical portion made of a material of high thermal diffusivity. This embodiment promotes both rapid heating and rapid cooling.

Advantageously, the molding surface of the molding portion of the die is made of nickel. This embodiment is particularly adapted for molding optical parts.

Thus, the mold is advantageously used on a plastic injection press for the production of large runs of camera miniature lenses.

This use of the mold is particularly suitable for the manufacture of lenses with a thickness comprised between 0.1 mm and 0.3 mm.

BRIEF DESCRIPTION OF THE DRAWINGS

The invention is implemented according to the preferred embodiments, in no way limiting, exposed hereafter with reference to FIG. 1 to FIG. 5 in which.

Figure 3:
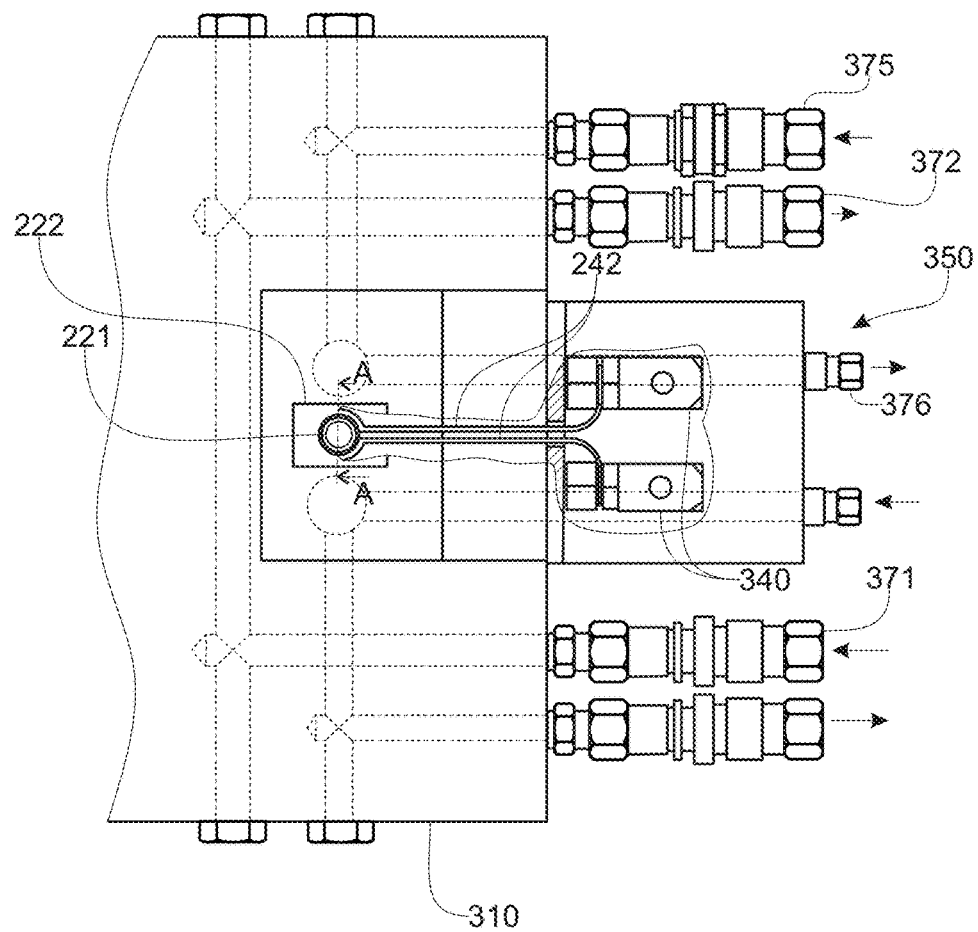
FIG. 3 shows, according to a partial front view, a partial cross section of an exemplary embodiment of a portion of the mold of the invention.

FIG. illustrates an exemplary embodiment according to a partial A-A section defined in FIG. 3 of ducts provided with baffles for performing a heat transfer fluid circulation cooling in the insert;

FIG. shows exemplary embodiments of the baffle in perspective views.

DESCRIPTION OF EMBODIMENTS

Figure 1:
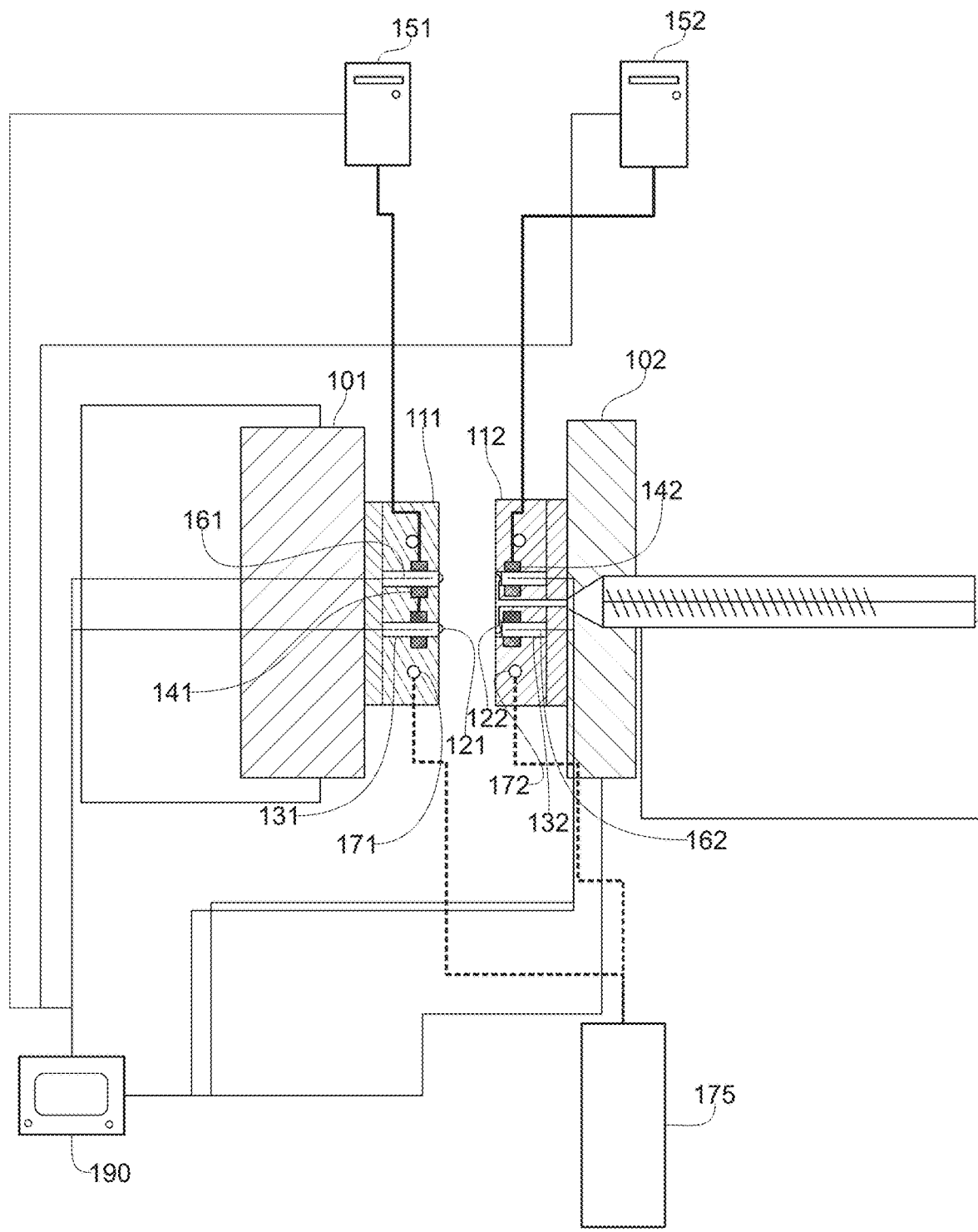
FIG. 1 is a schematic elevation view of an injection molding assembly implementing a mold according to the invention.

According to an exemplary embodiment, represented by FIG. 1, an installation implementing the mold of the invention comprises a plastic injection press, the two opposite parts (111, 112) of the mold being assembled on the platens (101, 102).

One of the platens (101) is movable towards and away from the other platen (102). Thus, when the two parts (111, 112) of the mold are brought together and held against each other by the opening/closing means of the press, they define a plurality of sealed cavities into which the molded material is injected in a liquid or a pasty state.

The material conforms to the molding surfaces of the sealed cavities, and then the mold is cooled to cause the material to solidify.

The mold is then opened by moving the platens of the press apart from each other and the parts thus made are removed.

Thus, according to this exemplary embodiment, a first part of the mold (111) carries dies comprising raised molding surfaces (121) and the facing mold part (112) carries dies comprising recessed molding surfaces (122).

When the mold is closed and the two parts (111, 112) are held against each other, the molding cavities are delimited by the molding surfaces (121, 122) of these two parts.

The dies carrying these molding surfaces (121, 122) are installed in contact with rods (131, 132) held in each part of the mold.

The rods are made of a material susceptible to induction heating, for example a ferromagnetic alloy, such as a martensitic tooling steel.

According to an embodiment, the molding surfaces are made of nickel, polished according to an optical quality polishing. Nickel may be deposited by any plating or coating technique on the molding surface.

Each rod is surrounded without mechanical contact by a coil (141, 142) made of an electrically conductive material such as copper.

The coils are connected to a high-frequency current generator (151, 152), the high frequency being typically comprised between 10 kHz and 200 kHz.

When a coil is supplied with high-frequency electric current, the rod being made of a material having a high magnetic permeability, the current induced in the rod heats it up. The rod transmits its heat to the die by conduction.

According to the sectional view of FIG. 1, each mold part (101, 102) comprises two dies, located at the end of two rods, each of the sets of rod, die and coil being identical for the same mold part (101, 102) without this specific arrangement being limiting.

According to alternative embodiments, the die is integral with the rod by being machined at the end thereof, or the die is assembled at the end of the rod by mechanical assembly, welding or brazing, or the die is produced by additive manufacturing directly on the end of the rod.

According to this embodiment, a thermocouple (161, 162) is installed in each rod and makes it possible to measure the temperature at the end of the rod, close to the molding surface.

Each mold part comprises conduits (171, 172) for the circulation of a heat transfer fluid.

According to one embodiment, said heat-transfer fluid is water and the conduits are connected to a pumping and cooling unit (175) which circulates the heat-transfer fluid in the conduits (171, 172) of the mold in order to cool it.

According to other exemplary embodiments, depending on the molding temperature and on the mass of the mold and of the molded part, the heat-transfer fluid is an oil or a gas, the circulation of said fluid being carried out in a closed circuit or in an open circuit.

The system of the invention advantageously comprises a control bay (190) controlling in particular the opening and closing of the press, the high-frequency generators, the electrical power supply of the coils and the circulation of the heat-transfer fluid, as a function, in particular, of the measurement resulting from the thermocouples set in the rods.

Thus, the system is controlled to produce reproducible injection and temperature cycles.

Figure 2:
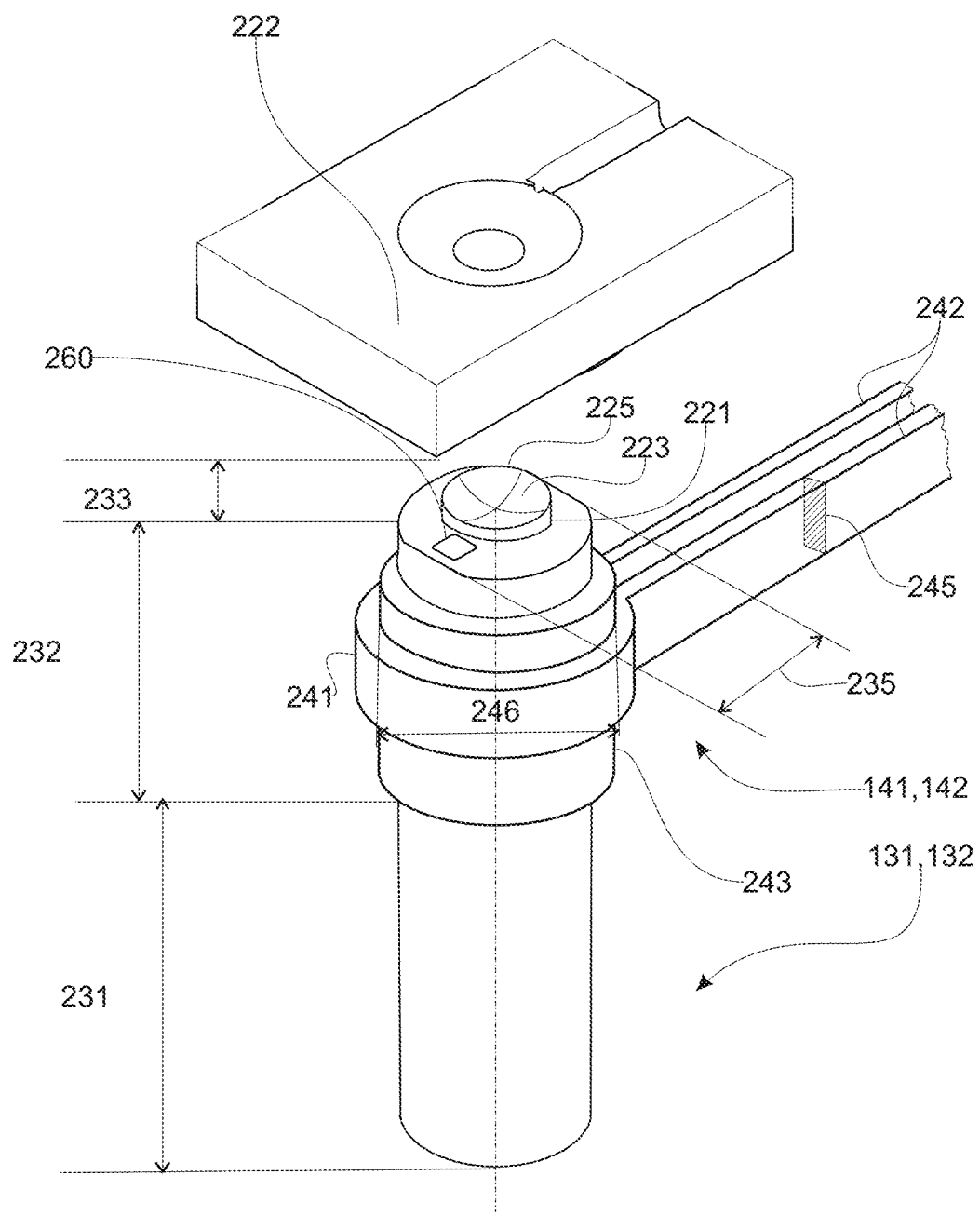
FIG. 2 shows an exploded side perspective view of an exemplary embodiment of a rod and a die implemented in a mold according to the invention.

As shown in FIG. 2, according to an exemplary embodiment, the rod (131, 132) essentially comprises 3 functional portions.

According to an exemplary embodiment, a first portion (231) allows its centering and its installation in the mold.

Advantageously, said mold comprises an insert, said insert being mounted in a casing. According to this embodiment, the rod (131, 132) is then mounted in the insert and the first portion (231) enables to position the rod into the insert.

In continuity with the first portion (231) and integral with it, a second substantially cylindrical portion (232) forms the area mainly subjected to electromagnetic induction.

For this purpose, the second cylindrical portion (232) of the rod is made of a material susceptible to induction heating and preferably a material of high magnetic permeability, such as a ferromagnetic steel.

According to another embodiment, the second cylindrical portion of the rod subjected to the induced magnetic field of the coil comprises a coating susceptible to induction heating. As a nonlimiting example, the rod is made of copper or of a copper alloy or more generally of a material with a high thermal conductivity, and comprises a coating, for example nickel, in the area subjected to the magnetic field generated by the coil. The thickness of the coating is selected according to the penetration depth of the induced currents.

The induction is produced by a coil (141, 142) comprising an annular portion (241) with an inner coil diameter (246) higher than a second portion outer diameter (235) which surrounds the second cylindrical portion (232) of the rod, and stems (242) for connecting the coil to a high frequency alternating current source.

As a nonlimiting example, the high frequency current source is a 25 kW generator producing an alternating current with a frequency comprised between 35 kHz and 70 kHz. This type of generator may supply up to 4 devices of the invention.

The stems (242) are in electrical contact with the annular part (241) and according to this embodiment are integral with the latter, this set being made of an electrically conductive material such as copper.

Advantageously, a cross section (245) of the coil is less than 10 mm$^2$ so as to limit the heating of the rod when the high-frequency alternating current produced by the generator flows through it.

According to an advantageous embodiment, the coil is insulated from the rod by an insulating ring (243) made of an electrically insulating material, transparent with respect to the magnetic field and resistant to the temperature generated in the coil (141) in the second portion of the rod.

This temperature may reach 450° C., however, the insulating ring, the rod and the coil are subjected to such a temperature only for a very short time, well below 1 second.

By way of nonlimiting example, the insulating ring (243) is made of a ceramic, alternatively, the ring is made of a plastic material, reinforced or not and capable of resisting such a temperature for a very short time.

The insulating ring (243) ensures the centering and holding of the coil in relation to the rod.

The third portion (233) of the rod is in contact with the die, more specifically with the molding portion (221) of the die.

According to this exemplary embodiment, the die comprises a molding portion (221) comprising the molding surface (223) of the manufactured part, the molding portion being integral with the second cylindrical portion (232) of the rod, and a technical portion (222) adapted to being assembled and centered on the molding portion (221).

According to alternative embodiments, the molding portion (221) is connected to the rod by mechanical assembly, welding or brazing.

The molding surface (223) of the die and the molding portion (221) over the length of the third portion of the rod, fit within a circle (225) the diameter of which is smaller than the second portion outer diameter (235) of the second cylindrical portion (232) of the rod.

This arrangement ensures rapid and uniform heating of the molding surface (223) although reduced power induction heating is localized on the second cylindrical portion (232) of the rod.

In return, this device is more particularly suitable for making small parts, with an outer footprint diameter (225) of the molding surfaces less than 5 mm preferably less than 2 mm and with a recess or protrusion height of the same order of magnitude. Therefore, the mold of the invention applies more particularly, but not exclusively, to the molding of small optical lenses such as those found on mobile phone cameras, webcams, micro surveillance cameras or micro-optical aiming devices.

The technical portion (222) of the die allows in particular the materialization of the parting plane of the cavity and provides sealing functions, functions of bringing the material into said cavity, and facilitates the cooling of the molding portion (221) by the diffusion of heat towards the cooling means of the mold.

According to an exemplary embodiment, the molding portion (221) is made of a tooling steel susceptible to induction heating. Advantageously, the molding surface of the molding portion of the die is made of nickel and is polished.

Thus, when the coil (141, 142) is supplied with high-frequency alternating current, it generates some heating effect on the die. However, the configuration of the coil, the annular portion (241) of which surrounds the second cylindrical portion (232) of the rod, means that most of the heating effect is concentrated on said second cylindrical portion of the rod, this heat being then transferred by conduction to the die over a short distance.

According to this exemplary embodiment, the rod advantageously comprises one or more housings (260) extending over all or part of its length, in order to introduce thermocouples therein.

These thermocouples advantageously measure the temperature closest to the molding portion (221).

The technical portion (222), according to exemplary embodiments, is made of the same tooling steel as the molding portion, but according to other variants, it is made of a steel or another material not susceptible to induction heating but having a high thermal diffusivity such as a copper alloy resistant to the processing temperatures of the molded material.

The thermal diffusivity of a material is defined by the ratio A/ρc where A is the thermal conductivity of the material, ρ its density and c its specific heat capacity. In the present case, a high thermal diffusivity is considered to be greater than $50.10^6$ m$^2$/s, preferably greater than $100.10^6$ m$^2$/s.

This last embodiment allows faster cooling of the die after injection of the material to be molded, According to an exemplary embodiment, shown by FIG. 3, the mold of the invention comprises a casing (310) capable of receiving one or more inserts (350), each insert carrying its own die and its own heating device connectable to a high-frequency alternating current generator by means of suitable connections (340).

The insert thus carries the die, consisting of the molding portion (221) bearing the molding surface (223) and the technical portion, the rod, the heating means comprising the coil and its connection means to a high-frequency generator and cooling means in the form of conduits for the circulation of a heat-transfer fluid.

Thus, the mold of the invention is modular and the molding portions are interchangeable without re-machining the casing or the insert, only the rod being changed.

Advantageously, the casing (310) comprises a circuit for the circulation of a heat transfer fluid for cooling the casing, the insert and the die.

Thus, according to one embodiment, one or more first circuits allow circulation between an inlet (371) and an outlet (372) for the circulation of the heat transfer fluid in the casing, around the insert.

One or more other circuits comprise an inlet (375) and an outlet (376) for the circulation of the heat transfer fluid passing through the casing (310) and through the insert (350) as close as possible to the rod. According to this exemplary embodiment, the insert (350) comprises an internal circuit for the circulation of the heat-transfer fluid, which internal circuit is connected to the circuit of the casing when the insert is installed therein. To this end, the insert comprises adapted sealing means (not shown) to secure this connection.

According to other embodiments, the insert comprises its own cooling circuit, which optionally uses a heat transfer fluid different from the one of the casings.

Thus, the casing is for example cooled by a circulation of water and the insert, and optionally the rod, are cooled by a circulation of a gas, for example air, argon, nitrogen, carbon dioxide or helium, without these examples being limiting.

Figure 4:
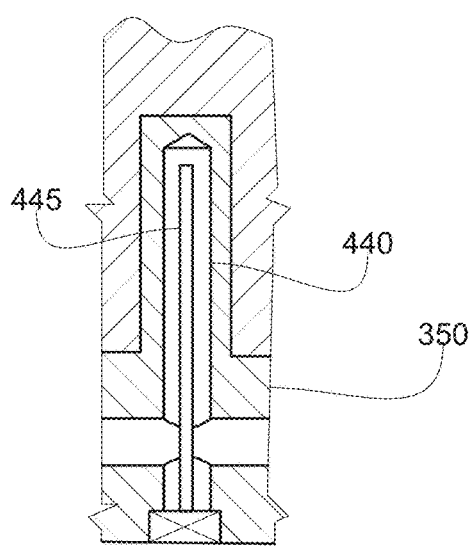

Thus, according to an exemplary embodiment shown in FIG. 4, the insert (350) and optionally the rod comprise conduits (450) for the circulation of a gas under pressure in order to ensure cooling thereof, these conduits advantageously comprising baffles (445) or turbulators in order to promote convective exchanges.

Figure 5:
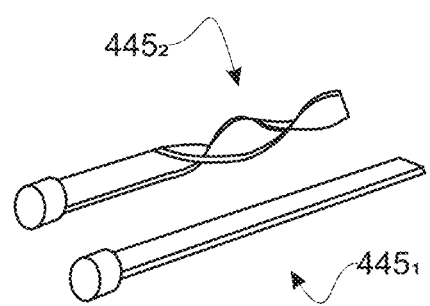

FIG. 5 shows exemplary embodiments of such baffles, straight ($445_1$) or twisted ($445_2$), said baffles are made of steel, bronze or a polymeric material without these examples being limiting.

The advantageous effect of these baffles is not limited to the case of a gas circulation, and the latter are also capable of promoting convective exchanges, and therefore cooling, in the case of a liquid heat-transfer fluid such as water or oil.

The localized induction heating of the rod and the fluid circulation circuits enable rapid heating and cooling cycles suitable for large-scale production.

As a nonlimiting example, for a typical molding cycle of a lens of a mobile phone camera, the heating of the molding surface to a temperature of 260° C. starting from a temperature of 130° C. corresponding to the temperature of the die after removal of the preceding part, is carried out in less than 5 seconds, more commonly in less than 2 seconds, with an induction power of less than 5 kW. The cooling from this temperature to the part removal temperature below 190° C. is obtained in 10 seconds with a water flow rate of 2.5 liters per minute per cooling circuit, using conduits with a diameter of 5 mm, allowing complete the cycle, between two removals in less than one minute.

The above description and the exemplary embodiments show that the invention achieves the intended objectives, in particular, the mold of the invention allows rapid heating and cooling of the impressions and of the parts included therein with reduced power and is particularly suitable for the production of thin parts of small dimensions such as optical lenses.

The invention claimed is:

1. A mold, configured for molding a part comprised in a diameter smaller than 10 mm, the mold comprising a casing adapted for being assembled on a press platen, the casing comprising a housing configured to receiving an insert; the insert being configured to be integrated into the casing and comprising a housing for a die comprising a molding portion bearing a molding surface with a molding surface perimeter outer diameter adapted for molding the part;

a heating device for heating the die;

wherein the heating device comprises:

a rod comprising a first portion, a second cylindrical portion with a portion outer diameter, made of a material of high magnetic permeability and a third portion made of a steel susceptible to induction heating and making the molding portion integral with the second cylindrical portion, the rod being mounted in the insert, the molding surface being substantially centered with respect to the second cylindrical portion; and a coil made of copper comprising an annular portion and stems for a connection to a high-frequency current generator, both a cross section of the stems and across section of the annular portion being less than or equal to 10 mm$^2$, an inner diameter of the annular portion being greater than the portion outer diameter, an insulating ring made of an electrically insulating material transparent with respect to a magnetic field and resistant to a temperature generated in the coil being comprised between the annular portion and the second cylindrical portion, so that when the coil is supplied in electric current by the high-frequency current generator, it generates an induced current in the second cylindrical portion, heating the second cylindrical portion by induction, the second cylindrical portion transmitting a heat by conduction through the second cylindrical portion and the third portion to the molding portion and the molding surface;

wherein the portion outer diameter is greater than the molding surface perimeter outer diameter and greater than a diameter of the molding portion over a length of the third portion.

2. The mold of claim 1, wherein the casing comprises at least one casing cooling circuit for circulating a heat transfer fluid for cooling the insert and the die.

3. The mold of claim 2, wherein the insert comprises an insert cooling circuit separated from the at least one casing cooling circuit and comprising a conduit configured for a circulation of a heat transfer fluid.

4. The mold of claim 3, wherein the conduit comprises a baffle.

5. The mold of claim 1, comprising a thermocouple housed within the rod, a hot junction of the thermocouple being close to the one end of the second cylindrical portion in integral with the die.

6. The mold of claim 1, wherein the molding surface perimeter outer diameter is less than 5 mm.

7. The mold of claim 6, wherein the molding surface perimeter outer diameter is less than 2 mm.

8. The mold of claim 1, wherein the molding portion is made of steel.

9. The mold of claim 8, wherein the molding surface is made of nickel.

10. The mold of claim 9, configured to be used on a plastic injection press for making a camera miniature lens in large runs.

11. The mold of claim 10, wherein a thickness of the camera miniature lens is comprised between 0.1 mm and 0.3 mm.

12. The mold of claim 1, wherein the insulating ring is made of a material selected among a ceramic, a plastic material and a reinforced plastic material.

* * * * *